US010435519B2

(12) United States Patent
Yajima et al.

(10) Patent No.: US 10,435,519 B2
(45) Date of Patent: Oct. 8, 2019

(54) COMPOSITE RESINOUS MATERIAL PARTICLES AND PROCESS FOR PRODUCING SAME (75) Inventors: Takeru Yajima, Hokuto (JP); Hidetoshi Ohta, Kofu (JP); Norihiro Nose, Yokohama (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 235 days.

(21) Appl. No.: 13/514,411

(22) PCT Filed: Jul. 16, 2010

(86) PCT No.: PCT/JP2010/062108
§ 371 (c)(1),
(2), (4) Date: Jun. 7, 2012

(87) PCT Pub. No.: WO2011/070813
PCT Pub. Date: Jun. 16, 2011

(65) Prior Publication Data
US 2012/0241692 A1 Sep. 27, 2012

(30) Foreign Application Priority Data
Dec. 12, 2009 (JP) .................................. 2009-282320

(51) Int. Cl.
*H01B 1/04* (2006.01)
*C08J 3/12* (2006.01)
(Continued)

(52) U.S. Cl.
CPC .............. *C08J 3/128* (2013.01); *C08J 7/065* (2013.01); *C08K 3/04* (2013.01); *C08J 2327/18* (2013.01); *C08J 2369/00* (2013.01)

(58) Field of Classification Search
CPC ...... H01L 2924/00013; H01L 2924/00; G03G 5/144; G03G 5/142; C08J 5/24; H01B 1/04
(Continued)

(56) References Cited

U.S. PATENT DOCUMENTS 3,835,116 A * 9/1974 Lydick ........................... 524/296
5,403,873 A * 4/1995 Nakamura et al. ........... 523/201
(Continued)

FOREIGN PATENT DOCUMENTS

CN 1656574 8/2005
CN 1898753 A 1/2007
(Continued)

OTHER PUBLICATIONS

International Search Report in PCT/JP2011/052538) dated Apr. 26, 2011.
(Continued)

Primary Examiner — William D Young
(74) Attorney, Agent, or Firm — Nixon & Vanderhye P.C.

(57) ABSTRACT

A composite resin material particle of the present invention includes: a resin material particle that is a material for producing a resin molding product; and a conductive nano-material, wherein a dispersion mixing layer, which is obtained by dispersedly mixing the conductive nano-material from the surface to the inside of the resin material particle, is formed over all of the surface or at least a part of the surface of the resin material particle, the conductive nano-material is dispersedly mixed within a resin material of the resin material particle in the dispersion mixing layer, and the whole of the dispersion mixing layer forms a conductive layer.

21 Claims, 6 Drawing Sheets (51) Int. Cl.
    *C08J 7/06*     (2006.01)
    *C08K 3/04*     (2006.01)

(58) Field of Classification Search
    USPC .......................................... 252/500, 511, 502
    See application file for complete search history.

(56) References Cited

U.S. PATENT DOCUMENTS

| | | | |
|---|---|---|---|
| 2002/0086198 A1* | 7/2002 | Ilno et al. | 429/34 |
| 2002/0161101 A1 | 10/2002 | Carroll et al. | |
| 2004/0211942 A1 | 10/2004 | Clark et al. | |
| 2005/0031525 A1 | 2/2005 | Iijima et al. | |
| 2005/0070658 A1 | 3/2005 | Ghosh et al. | |
| 2005/0191491 A1 | 9/2005 | Wang et al. | |
| 2007/0199729 A1* | 8/2007 | Siegel | C08K 3/22 174/73.1 |
| 2007/0265379 A1* | 11/2007 | Chen | B82Y 30/00 524/404 |
| 2010/0255185 A1 | 10/2010 | Bahnmueller et al. | |

FOREIGN PATENT DOCUMENTS

| | | |
|---|---|---|
| CN | 101098921 | 1/2008 |
| CN | 101132067 | 2/2008 |
| JP | 08-506612 | 7/1996 |
| JP | 2000-511245 | 8/2000 |
| JP | 2001-158827 | 6/2001 |
| JP | 2003-100147 | 4/2003 |
| JP | 2003-192914 | 7/2003 |
| JP | 2003-221510 | 8/2003 |
| JP | 2003-315531 | 11/2003 |
| JP | 2004-030926 | 1/2004 |
| JP | 2004-087427 | 3/2004 |
| JP | 2004-127737 | 4/2004 |
| JP | 2006-008945 | 1/2006 |
| JP | 2006-8945 * | 1/2006 |
| JP | 2006-016450 | 1/2006 |
| JP | 2006-505483 | 2/2006 |
| JP | 2006-069165 | 3/2006 |
| JP | 2006-282843 | 10/2006 |
| JP | 2007-035811 | 2/2007 |
| JP | 2007-039623 | 2/2007 |
| JP | 2007-222803 | 9/2007 |
| JP | 2008-537016 | 9/2008 |
| JP | 2008-239765 | 10/2008 |
| JP | 2009-074072 | 4/2009 |
| JP | 2009-109910 | 5/2009 |
| JP | 2009-160754 | 7/2009 |
| JP | 2010-235320 | 10/2010 |
| KR | 10-2005-0051939 | 6/2005 |
| KR | 10-2006-0060682 | 6/2006 |
| WO | WO 03/080513 | 10/2003 |
| WO | WO 2004/048263 A1 | 6/2004 |
| WO | WO 2004/097852 | 11/2004 |
| WO | WO 2005/110594 | 11/2005 |
| WO | WO 2007/010517 | 1/2007 |
| WO | WO 2009/071220 A2 | 6/2009 |
| WO | WO 2009/098779 A1 | 8/2009 |

OTHER PUBLICATIONS

International Search Report for PCT/JP2010/062108, dated Aug. 10, 2010.
Ning Li et al; "Nano Letters", 2006, vol. 6, No. 6, pp. 1141-1145.
M.B. Bryning et al; "Advanced Materials", May 2005, vol. 17, Issue 9, pp. 1186-1191.
Search Report in EP 10835735.1 dated Sep. 1, 2014.
English language translation of Office Action in JP 2012-556675 dated Oct. 7, 2014.
Office Action issued in U.S. Appl. No. 13/983,618 dated Feb. 25, 2015.
Office Action issued in Chinese App. No. 201180066838.5 dated Dec. 23, 2014 (with partial English translation).
Office Action issued in U.S. Appl. No. 13/983,618 dated Apr. 23, 2015.
Korean Office Action issued in App. No. 10-2015-7017588 dated Dec. 9, 2015 (w/ partial translation).
Korean Office Action issued in App. No. 10-2012-7014946 dated Jan. 18, 2016 (w/ translation).
Korean Notice of Allowance issued in App. No. 10-2015-7017588 dated Jun. 21, 2016 (with partial translation).
Notice of Opposition issued by the European Patent Office in Appln. No. 10835735.1 dated Jan. 10, 2018.

* cited by examiner

COMPOSITE RESINOUS MATERIAL PARTICLES AND PROCESS FOR PRODUCING SAME

TECHNICAL FIELD

The present invention relates to a composite resin material, in which the resin is rendered functional by adding an additive. More in detail, it relates to a conductive composite resin material, in which the resin is rendered conductive by adding a conductor.

This application is the U.S. national phase of International Application No. PCT/JP2010/062108, filed 16 Jul. 2010, which designated the U.S. and claims priority to Japan Application No. 2009-282320, filed 12 Dec. 2009, the entire contents of each of which are hereby incorporated by reference.

BACKGROUND ART

Conductive resins have been adopted for the application to antistatic components, plastic electronic components of electronic products, and the like. In particular, these resins are employed in cases where an addition of a metal layer or the like over a resin surface or the like is not enough to achieve sufficient performance. Since an increasing number of electronic components are made of plastics and new applications for electronic components are being explored day by day, the development of conductive resins is important from industrial and commercial points of view.

Polyacetylene and the like can be exemplified as a resin that has a conductive property by itself. However, such a conductive resin often fails to display sufficient performance in practical use. For example, if the lubricity of a fluorine-based resin or the like is necessary, and if at the same time the conductive property is also necessary, the fluorine-based resin or such a non-conductive resin has to be rendered conductive by adding a conductive material such as carbon black.

However, if carbon black is used as such a conductive material, the conductivity of the carbon black itself is low. Thus, a large amount of carbon black has to be added. In cases where the dose of a conductive material is large in this way, a problem arises in that the molding property and the strength of the resin is lowered.

Accordingly, in order to avoid such a problem, it is necessary to reduce the dose of the conductive material as much as possible, and also the conductive material to be added has to be highly conductive. Such a highly conductive material can be exemplified by a carbon nanotube and such a carbon nano-material.

Since these carbon nano-materials contain a large amount of free electrons, they have excellent conductivity. In addition, since carbon nano-materials are hydrophobic, they have a high affinity with resins. Therefore, a carbon nano-material is readily dispersed in a resin as well as being firmly fixed within the resin. Accordingly, carbon nano-materials have excellent properties as an additive to render a resin conductive. However, since these carbon nano-materials are expensive, it is necessary to reduce the dose of the carbon nano-material even lower so as to reduce the price of the conductive resin as a resulting product.

At the present stage, such a carbon nano-material is evenly added in a resin before use. Examples of preceding techniques are disclosed in Japanese Unexamined Patent Application, First Publication No. 2003-100147 (Patent Document 1), Japanese Unexamined Patent Application, First Publication No. 2003-192914 (Patent Document 2), and Japanese Unexamined Patent Application, First Publication No. 2003-221510 (Patent Document 3).

Another example of a conductive material capable of rendering a resin conductive by the addition to the resin can be given by a nanometal. Such a nanometal means superfine particles made of a metal having a diameter or an outer diameter of 1 to 100 nm. Particularly, nanometals made of gold, silver, and such noble metals have excellent conductivity and corrosion resistance. These nanometals are capable of rendering a resin highly conductive with a little amount of dose.

Nanometals per se are not hydrophobic but can be rendered hydrophobic by coating without worsening the conductivity, by which the affinity with a resin can be improved. Such coating can be applied for rendering a nanometal made from copper or such a base metal, to be corrosion resistant. Accordingly, such a nano-base metal can also be adopted as a conductive material to be added to a resin.

However, the cost of the raw material is expensive if a noble metal is adopted as a nanometal, while the cost of coating or such working is expensive if a base metal is adopted. In other words, the cost is expensive in either way. Accordingly, it is necessary to reduce the dose of the nanometal even lower so as to reduce the price of the conductive resin as a resulting product.

At the present stage, such a nanometal is evenly added in a resin before use. Examples of preceding techniques are disclosed in Japanese Unexamined Patent Application, First Publication No. 2003-315531 (Patent Document 4) and Japanese Unexamined Patent Application, First Publication No. 2004-87427 (Patent Document 5).

CITATION LIST

Patent Literature

Patent Document 1: Japanese Unexamined Patent Application, First Publication No. 2003-100147
Patent Document 2: Japanese Unexamined Patent Application, First Publication No. 2003-192914
Patent Document 3: Japanese Unexamined Patent Application, First Publication No. 2003-221510
Patent Document 4: Japanese Unexamined Patent Application, First Publication No. 2003-315531
Patent Document 5: Japanese Unexamined Patent Application, First Publication No. 2004-87427

SUMMARY OF INVENTION

Technical Problem

Every one of these preceding techniques has a crucial disadvantage. That is, a largeness of the relative amount of the conductive material to be added. In every one of these preceding techniques, it is necessary to add a large amount of the conductive material because the conductive material is evenly added in the resin. If the conductive material to be added is expensive, the conductive resin as a resulting product will also be expensive. In addition, even if the conductive material is inexpensive, the conductive material will impose adverse effects on the resin, such as a worsening of the workability and a lowering of the strength.

In order to avoid such adverse effects, it is necessary to add as low a concentration of the conductive material as possible. However, if only a low concentration of the conductive material is evenly added to a resin, the conductivity will be low. In order to prevent such a lowering of the conductivity, it is necessary to concentrate the conductive material in limited areas to form a conductive net. By so doing, the conductivity can be maintained. In addition, if the conductive material is present in limited areas and distributed in a net-like form, a desired conductive rate can be achieved with a low concentration of the conductive material. Accordingly, the dose of the conductive material can be reduced, which makes it possible to reduce the price of the conductive resin as well as to avoid the adverse effects on the conductive resin caused by excessive dosage.

Solution to Problem

The present invention was completed to solve the above-mentioned problems.

The composite resin material particle of the present invention is characterized in that a conductive material is dispersedly mixed in the surface of a resin material particle. In this composite resin material particle, the conductive material is firmly embedded within the surface of the resin material particle. Therefore, the conductive material will hardly spall off. The conductive material forms a conductive layer in the composite resin material particle. During the production of a molding product by molding the composite resin material particles, the resin material in the composite resin material particles is melted and fused, by which a firm molding product is created. Furthermore, in the melting and fusion of the composite resin material particles, the conductive material is kept from being freed due to the viscosity of the melted resin material liquid. Thus, the continuity of the conductive layer can be maintained. Accordingly, a conductive net having continuity and conductivity is formed inside the molding product, which renders the molding product conductive.

The production method of a composite resin material particle of the present invention is characterized in that a dispersion mixing layer is formed by mixing a conductive material into a swollen and softened surface of a resin material particle in carbon dioxide in a subcritical or supercritical state, with use of ultrasonic waves. Because of the action of the ultrasonic waves, the conductive material is distributed substantially over all of the surface of the resin material particle, and firmly embedded from the surface to the inside of the resin particle. Therefore, the conductive material is stably and firmly distributed in the surface of the resin material particle, enabling to form a highly conductive dispersion mixing layer that can hardly spall off.

A first aspect of the present invention is a composite resin material particle including:

a resin material particle that is a material for producing a resin molding product; and a conductive nano-material, wherein a dispersion mixing layer, which is obtained by dispersedly mixing the conductive nano-material from the surface to the inside of the resin material particle, is formed over all of the surface or at least a part of the surface of the resin material particle, the conductive nano-material is dispersedly mixed within a resin material of the resin material particle in the dispersion mixing layer, and the whole of the dispersion mixing layer forms a conductive layer.

A second aspect of the present invention is a composite resin material particle according to the first aspect, wherein the dispersion mixing layer has a predetermined mixed thickness and is formed over all of the surface of the composite resin material particle, and a resin-only region that is solely composed of the resin material is present within the inside of the composite resin material particle which is enclosed by the dispersion mixing layer.

A third aspect of the present invention is a composite resin material particle according to the second aspect, wherein the mixed thickness of the dispersion mixing layer is from 0.1 µm to 10 µm.

A fourth aspect of the present invention is a composite resin material particle according to the first aspect, the whole inside of which is solely composed of the dispersion mixing layer.

A fifth aspect of the present invention is a composite resin material particle according to any one of the first to fourth aspects, which is a pellet having a diameter of 100 µm or larger.

A sixth aspect of the present invention is a composite resin material particle according to any one of the first to fourth aspects, which is a powder having a diameter of 100 µm or smaller.

A seventh aspect of the present invention is a composite resin material particle according to any one of the first to sixth aspects, wherein the conductive nano-material is one or more selected from the group consisting of a carbon nanotube, a carbon nanofiber, a carbon nanocoil, a carbon nanotwist, a carbon nanohorn, a fullerene, carbon black, ketjen black, acetylene black, a metal nanoparticle, a metal nanoplate, a metal nanorod, and a metal nanowire.

An eighth aspect of the present invention is a composite resin material particle according to any one of the first to seventh aspects, wherein the conductive nano-material has a shape with an outer diameter of 150 nm or smaller and a length of 500 nm or longer.

A ninth aspect of the present invention is a composite resin material particle according to any one of the first to eighth aspects, wherein the resin material is one or more selected from the group consisting of a fluorine-based resin, a polycarbonate resin, an olefin-based resin, a polyether ether ketone resin, a formalin-based resin, an ester resin, and a styrene-based resin.

A tenth aspect of the present invention is production method of a composite resin material particle, comprising:

filling at least a resin material particle, a conductive nano-material, a solvent for propagating ultrasonic waves, and liquid carbon dioxide, into a pressure vessel;

holding the inside of the pressure vessel at a temperature and a pressure which can keep the liquid carbon dioxide in a subcritical or supercritical state;

dispersedly mixing the conductive nano-material from the surface to the inside of the resin material particle by using ultrasonic waves;

thereafter evaporating the liquid carbon dioxide by reducing the pressure; and further volatilizing the solvent either concurrently or with time lag, to obtain the composite resin material particle in which a dispersion mixing layer is formed on the surface of the resin material particle.

An eleventh aspect of the present invention is a production method of a composite resin material particle according to the tenth aspect, wherein the solvent is a highly volatile solvent at normal temperature and normal pressure.

A twelfth aspect of the present invention is a production method of a composite resin material particle according to the eleventh aspect, wherein the solvent is one or more selected from the group consisting of an alcohol, a ketone, an ester, an ether, an organochloride, and an organofluoride.

A thirteenth aspect of the present invention is a production method of a composite resin material particle according to any one of the tenth to twelfth aspects, wherein a ratio by weight of the solvent to the conductive nano-material is 20 or more.

A fourteenth aspect of the present invention is a production method of a composite resin material particle according to any one of the tenth to thirteenth aspects, wherein a ratio by weight of the liquid carbon dioxide:the solvent is from 0.05:1 to 20:1.

A fifteenth aspect of the present invention is a production method of a composite resin material particle according to any one of the tenth to fourteenth aspects, wherein a dispersant and/or a surfactant is added in the pressure vessel.

A sixteenth aspect of the present invention is a production method of a composite resin material particle according to any one of the tenth to fifteenth aspects, wherein the temperature is over 25° C. and below the melting point temperature of the resin material.

A seventeenth aspect of the present invention is a production method of a composite resin material particle according to any one of the tenth to sixteenth aspects, wherein the maximum pressure inside the pressure vessel is 100 MPa.

An eighteenth aspect of the present invention is a production method of a composite resin material particle according to any one of the tenth to seventeenth aspects, wherein a generator of the ultrasonic waves is a horn type of a 150 W or higher.

A nineteenth aspect of the present invention is a production method of a composite resin material particle according to any one of the tenth to eighteenth aspects, wherein the conductive nano-material has been oxidatively treated.

A twentieth aspect of the present invention is a production method of a composite resin material particle according to any one of the tenth to nineteenth aspects, wherein a dispersion liquid, which is obtained by mixing and dispersing at least the conductive nano-material in the solvent, is filled into the pressure vessel together with the liquid carbon dioxide and the resin material particle.

A twenty first aspect of the present invention is a production method of a composite resin material particle according to the twentieth aspect, wherein the dispersion liquid contains a dispersant and/or a surfactant.

Advantageous Effects of Invention

According to the first aspect of the present invention, a dispersion mixing layer having a conductive property is formed by firmly embedding a conductive nano-material within the dispersion mixing layer in the composite resin material particle. Therefore, the conductive nano-material is firmly fixed from the surface to the inside of the composite resin material particle and thus will not spall off. The dispersion mixing layer referred to here is a comprehensive expression including all types of layers such as a dispersedly implanted layer in which the conductive nano-material is implanted in the surface of the resin material particle, a dispersedly kneaded layer in which the conductive nano-material is kneaded into the surface of the resin material particle, and a dispersedly embedded layer in which the conductive nano-material is embedded in the surface of the resin material.

In addition, the conductivity of the composite material particle can be maintained even if the dispersion mixing layer is formed only on the surface of the composite resin material particle. Therefore, there is no need of using a large amount of the conductive nano-material, enabling the production of composite resin material particles with low cost. Furthermore, during the production of a molding product by molding composite resin material particles, a conductive net originating from the conductive nano-material is formed inside the molding product. Therefore, a highly conductive molding product can be obtained. In the molding process, the composite resin material particles lose their shapes by melting and liquefaction. However, the conductive nano-material is kept from being freed due to the viscosity of the melted resin material liquid. Thus, the continuity of the dispersedly implanted layer can be maintained. Accordingly, the conductive net formed from the conductive nano-material in the dispersedly implanted layer also has continuity and conductivity. In addition, because the melted resin material of the composite resin material particles are fused in the molding process, a sturdy and tough molding product can be obtained.

In order to form the conductive net, it is not necessary to form the dispersion mixing layer over all of the surface of the composite resin material particle, it being acceptable to form the layer only on some parts of the surface. However, as the dispersion mixing layer covers a smaller area of the composite resin material particle, the formed conductive net would have lower continuity. This leads to lower conductivity of the conductive net. Accordingly, it is preferable to cover as large an area of the dispersion mixing layer as possible. The inventors of the present invention confirmed that, when the rate of covering the dispersion mixing layer is 60% or higher, the conductivity of the molding product obtained by molding is sufficiently high. It was also confirmed that, when the dispersion mixing layer is formed in island-like shapes, the conductivity of the molding product obtained by molding is sufficiently high provided that the space between these island-like shapes of the dispersion mixing layer is 500 nm or smaller.

When the dispersion mixing layer is formed by the tenth aspect of the present invention, the conductive nano-material is dispersedly mixed from the swollen and softened surface to the inside of the resin material particle that serves as a raw material, due to the action of ultrasonic waves. If the grain diameter of the resin material particle is sufficiently small and if the melting point of the resin material is sufficiently low, the whole of the resin material particle will be swollen and softened. Accordingly, if the amount of the conductive nano-material and the time to produce the composite resin material particle are sufficient, the conductive nano-material will be mixed in the whole of the resin material particle.

According to the second aspect of the present invention, the dispersion mixing layer has a predetermined mixed thickness and is formed over all of the surface of the composite resin material particle, and a resin-only region that is solely composed of the resin material is present within the inside of the composite resin material particle which is enclosed by the dispersion mixing layer. Therefore, a conductive net having high continuity and high conductivity can be obtained inside the molding product in the molding process, even though the conductive nano-material is not added in the whole composite resin material particle including the interior of itself. Accordingly, a highly conductive molding product can be obtained while saving the conductive nano-material. Moreover, this leads to lower prices and higher performance of composite resin material particles and a molding product as a resulting product.

According to a third aspect of the present invention, the mixed thickness of the dispersion mixing layer is from 0.1

µm to 10 µm. Therefore, the mixed thickness can be kept thick enough to maintain the conductivity of the dispersion mixing layer as well as kept thin enough to avoid the waste of the conductive nano-material. This leads to lower prices and higher performance of composite resin material particles and a molding product as a resulting product.

According to the fourth aspect of the present invention, the whole interior of the composite resin material particle is solely composed of the dispersion mixing layer.

Therefore, a composite resin material particle, in which the conductive nano-material is evenly distributed in the whole composite resin material particle, can be obtained. Composite resin material particles having no presence of such a resin-only region are required sometimes depending on the intended end-usage. This aspect can enable to obtain such composite resin material particles.

According to the fifth aspect of the present invention, the composite resin material particle is a pellet having a diameter of 100 µm or larger. Therefore, highly conductive composite resin material particles can be obtained with low cost. The composite resin material particles of this aspect have relatively large diameters and thus have relatively small surface areas. Accordingly, the amount of the conductive nano-material for forming the dispersion mixing layer can be small. This leads to a lower price of the composite resin material particle. The diameter of each of the composite resin material particles of this aspect is preferably from 2 to 5 mm.

According to the sixth aspect of the present invention, the composite resin material particle is a powder having a diameter of 100 µm or smaller. Therefore, a highly dense conductive net can be formed in the molding product in the molding process. Accordingly, the molding product can be kept highly conductive. The composite resin material particles of this aspect have relatively small diameters and thus have relatively large surface areas. Accordingly, in the production of a molding product from the composite resin material particles, a conductive net originating from the dispersion mixing layer can be densely formed. Thus, a highly conductive molding product can be obtained. In order to have sufficiently large surface areas of the composite resin material particles, the grain diameter of the composite resin material particle of this aspect is preferably 5 µm or smaller.

There is no particular restriction in the lower limit of the diameter in this aspect. The minimum diameter which is capable of executing the present invention would serve as a lower limit. For example, the lower limit of this diameter can be exemplified by 1 µm, and preferably 5 µm.

According to the seventh aspect of the present invention, one or more selected from the group consisting of a carbon nanotube, a carbon nanofiber, a carbon nanocoil, a carbon nanotwist, a carbon nanohorn, a fullerene, carbon black, ketjen black, acetylene black, a metal nanoparticle, a metal nanoplate, a metal nanorod, and a metal nanowire can be used as the conductive nano-material. Therefore, in the production of the composite resin material particles, the conductive nano-material can be selected according to the intended end-usage.

Carbon nano-materials such as a carbon nanotube are highly corrosion resistant, highly hydrophobic, and highly conductive. Thus, these are optimum for forming the dispersion mixing layer on the composite resin material particle. Although a higher aspect ratio will result in a higher conductivity of the dispersion mixing layer, sufficient conductivity can be achieved even by using a material having a low aspect ratio such as a fullerene.

Conventional types of conductive additives such as carbon black, ketjen black, and acetylene black have been so far applied to a wide range of uses, and with good performance, although their conductivity is low. Thus, the composite resin material particle of the present invention can be reliably produced by using these conductive additives.

Nanometals such as a metal nanowire has extremely high conductivity, and thus are useful for forming a highly conductive dispersion mixing layer. Although a higher aspect ratio will result in a higher conductivity of the dispersion mixing layer, high conductivity can be achieved even by using a material having a low aspect ratio such as a metal nanoparticle.

According to the eighth aspect of the present invention, the conductive nano-material has a shape with an outer diameter of 150 nm or smaller and a length of 500 nm or longer. Therefore, a highly conductive material can be produced by using a material having a high aspect ratio. As the aspect ratio of the conductive nano-material becomes higher, pieces of the conductive nano-material can be more highly entangled with each other in the dispersion mixing layer. Moreover, as the average length of the electron pathway in the conductive nano-material becomes longer, higher electroconductivity is achieved. Accordingly, the conductivity of the dispersion mixing layer is increased. In this way, the use of a material having a high aspect ratio makes it possible to produce a highly conductive composite resin material particle and a highly conductive molding product. The conductive nano-material of this aspect preferably has an outer diameter of 80 nm or smaller and a length of 1000 µm or longer.

The specific shape of the conductive nano-material can be exemplified by a cylindrical shape and a columnar shape.

According to the ninth aspect of the present invention, one or more selected from the group consisting of a fluorine-based resin, a polycarbonate resin, an olefin-based resin, a polyether ether ketone resin, a formalin-based resin, an ester resin, and a styrene-based resin can be used as the resin material of the composite resin material particle. Therefore, the practical utility can be improved by using an optimum resin in the actual use. Moreover, various types of resins can be rendered conductive. In addition, these resin materials can be readily swollen by liquid carbon dioxide, and thus are suitable for forming the dispersion mixing layer by the tenth aspect of the present invention.

According to the tenth aspect of the present invention, resin material particles which are swollen by liquid carbon dioxide are subjected to ultrasonic waves to thereby dispersely mix the conductive nano-material from the surface to the inside of the resin material particle. Therefore, the conductive nano-material is embedded in the surface of the resin material particle. Accordingly, sedimentation of unmixed pieces of the conductive nano-material on the resin material particle can be prevented. Moreover, the conductive material is firmly fixed from the surface to the inside of the composite resin material particle, and thus will not spall off. In addition, the conductive nano-material is dispersed by ultrasonic waves. Therefore, the conductive nano-material can be prevented from being polarized in the direction of the force of gravity on the resin material particle, enabling to form the dispersion mixing layer almost over all of the surface of the resin material particle. The ultrasonic waves herein are not capable of generating cavitation in liquid carbon dioxide, and thus can not be propagated in the liquid carbon dioxide. However, these waves can be propagated by a solvent which is added at the same time.

In addition, since carbon dioxide in a subcritical state or a supercritical state is used as the swelling liquid, it is possible to completely remove the carbon dioxide by reducing the pressure after completion of the production of the dispersion mixing layer, which can make the process easier and simpler. In addition, the solvent for propagating ultrasonic waves can be volatilized after evaporating the carbon dioxide. If the solvent is highly volatile enough, the solvent can be volatilized at the same time as the evaporation of the carbon dioxide. Furthermore, because the solvent is more volatile than carbon dioxide, the solvent can be volatilized first.

The term supercritical state used herein refers to a state of a material in which the temperature and the pressure are equal to or above the critical point. The supercritical point of carbon dioxide refers to a state in which the temperature is equal to or above 31.1° C. and the pressure is equal to or above 72.8 atm. In this state, since carbon dioxide has a diffusive property as a gas and a dissolving property as a liquid, it is possible to swell the resin material particles while diffusing them. Therefore, the conductive nano-material can be quickly and evenly dispersed and mixed. In addition, the term subcritical state used herein refers to a state in which the pressure is equal to or above the critical point and the temperature is equal to or below the critical point. Even in this state, carbon dioxide is able to efficiently swell the resin. Therefore, it is possible to promote the formation of the dispersion mixing layer.

The conductive nano-material is dispersedly mixed from the swollen and softened surface to the inside of the resin material particle, due to the action of ultrasonic waves. If the grain diameter of the resin material particle is sufficiently small, the whole of the resin material particle will be softened. Accordingly, if the amount of the conductive nano-material and the time to produce the composite resin material particles are sufficient, the conductive nano-material will be mixed in the whole of the resin material particle.

The thus produced composite resin material particles are melted and fused to form a molding product, at the same time of which the conductive nano-material within the dispersedly implanted layer is kept from being freed due to the viscosity of the melted resin material liquid. Thus, the continuity of the dispersedly implanted layer can be maintained. Therefore, a continuous conductive net can be formed inside the molding product. Accordingly, by adopting composite resin material particles of this aspect, a conductive molding product can be produced with use of a small amount of a conductive nano-material. In addition, because the composite resin material particles are melted are fused in the molding process, a sturdy and tough molding product can be produced.

According to the eleventh aspect of the present invention, a highly volatile solvent is used as the solvent. Therefore, this leads to an easier and simpler removal of the solvent after the formation of the dispersion mixing layer in the tenth aspect, enabling to readily produce the composite resin material particles.

According to the twelfth aspect of the present invention, an alcohol, a ketone, an ester, an ether, an organochloride, and an organofluoride can be used as the solvent. Therefore, highly volatile organic solvents which have been already widely and commercially available can be adopted. This leads to a lower price of the composite resin material particle.

According to the thirteenth aspect of the present invention, the ratio by weight of the solvent to the conductive nano-material is 20 or more. Therefore, the conductive nano-material can be dispersed in the solvent before the addition, enabling to improve the dispersibility of the conductive nano-material in the pressure vessel. Accordingly, a composite resin material particle in which the conductive nano-material is mixed in a highly dispersed manner can be obtained.

According to the fourteenth aspect of the present invention, the ratio by weight of the liquid carbon dioxide:the solvent is from 0.05:1 to 20:1. Therefore, the ratio of the liquid carbon dioxide to the solvent can be selected substantially optionally, enabling to improve the flexibility of the process.

According to the fifteenth aspect of the present invention, a dispersant and/or a surfactant are/is added in the pressure vessel. Therefore, a composite resin material particle in which the conductive nano-material is highly dispersed in the dispersion mixing layer can be obtained, even if the conductive nano-material is relatively difficult to disperse. The dispersant usable here can be exemplified by the Exceparl PE-MO and the Trimex N-08 manufactured by Kao Corporation and the like. The surfactant usable here can be exemplified by the Triton X-100 manufactured by Acros-Organics, the Targetol NR-7 manufactured by Sigma-Aldrich, sodium dodecyl sulfate (SDS), and sodium dodecyl benzene sulfonate (SDBS), and the like.

According to the sixteenth aspect of the present invention, the temperature for forming the dispersion mixing layer is over 25° C. and below the melting point temperature of the resin material. Therefore, the swelling of the resin material particle that is necessary for forming the dispersion mixing layer can be promoted by keeping the liquid carbon dioxide in a subcritical state or a supercritical state. Moreover, the dispersion mixing layer can be formed without breaking the structure of the resin material particle. In this aspect, the temperature for forming the dispersion mixing layer is preferably equal to or over 50° C. and below the melting point temperature of the resin material. At this or higher temperature, the swelling of the resin material particle can be reliably conducted.

According to the seventeenth aspect of the present invention, the maximum pressure inside the pressure vessel is 100 MPa. Therefore, the composite resin material particles can be produced without breaking the pressure vessel.

According to the eighteenth aspect of the present invention, a generator of the ultrasonic waves is a horn type of a 150 W or higher. Therefore, strong ultrasonic waves necessary for forming the dispersion mixing layer can be obtained. The ultrasonic waves in the present invention and this aspect preferably have a frequency of 15 kHz or higher and an amplitude of 20 µm or larger.

According to the nineteenth aspect of the present invention, the conductive nano-material has been oxidatively treated. Therefore, a composite resin material particle in which the conductive nano-material is highly dispersed in the dispersion mixing layer can be obtained, even if the conductive nano-material is relatively difficult to disperse. The oxidative treatment herein can be exemplified by: a treatment in which the conductive nano-material is immersed in one or more selected from the group consisting of sulfuric acid, nitric acid, hydrochloric acid, and phosphoric acid; a treatment in which the conductive nano-material is immersed in an ozone solution; and the like. The conductive nano-material in this aspect has to be unbreakable by such an oxidative treatment, and a carbon nano-material is most preferable.

According to the twentieth aspect of the present invention, the conductive nano-material in an even and dispersed state is dispersedly mixed with the resin material particles, by using a previously produced dispersion liquid of the conductive nano-material. Therefore, the conductive nano-material can be reliably dispersed in the dispersion mixing layer, enabling to achieve better evenness of the conductive nano-material in the dispersion mixing layer. Accordingly, the conductivity of the produced composite resin material particles and a molding product obtained by molding them can be improved.

The inventors of the present invention discovered from experiments of the production of composite resin material particles that the dispersibility of the conductive nano-material in the dispersion mixing layer was low when the flowability of resin material particles was low. The shape and the property of resin material particles having low flowability herein can be exemplified by fibrous or such slender particles, particles whose bulk density is low, highly compressible particles, and the like. All of these particles are easily entangled with each other by stirring or applying a stress, and are easily kept from being freed.

The reason why the lowering of the flowability of resin material particles results in the lowering of the dispersibility of the conductive nano-material in the formed dispersion mixing layer, can be considered as follows. Because of the lowering of the diffusive movement of the particles, these material resin particles mutually hinder diffusive movement and even diffusion of themselves, and also hinder diffusive movement and even diffusion of the conductive nano-material. Therefore, the dispersedly mixed conductive nano-material is polarized only in a limited part of the resin material particles. In addition, the resin material particles are entangled with each other to thereby overlap each other in some parts. These overlapped parts are shielded from the liquid carbon dioxide and the conductive nano-material. It is possible to prevent such polarization of the conductive nano-material on the resin material particle, by previously dispersing the conductive nano-material in a solvent so as to bring it in a dispersion liquid state, and thereafter dispersedly mixing the conductive nano-material with the resin material particles. By so doing, the dispersibility of the conductive nano-material in the formed dispersion mixing layer can be improved.

In this aspect, at least the conductive nano-material is mixed in a solvent. However, a different material may also be mixed in the solvent together with the conductive nano-material. Such a different material can be exemplified by a dispersant, a surfactant, liquid carbon dioxide, and the like. In addition, regarding the method for producing the dispersion liquid, the liquid may also be stirred after mixing the conductive nano-material and the like in the solvent. If the dispersion of the conductive nano-material is not sufficient by stirring, an ultrasonic treatment or the like may also be applied to improve the dispersibility.

According to the twenty first aspect of the present invention, the dispersion liquid contains a dispersant and/or a surfactant. Therefore, the dispersibility of the conductive nano-material in the dispersion liquid increases, and accordingly the dispersibility of the conductive nano-material in the dispersion mixing layer also increases. In addition, a conductive nano-material which is difficult to disperse in a solvent can also be dispersed in the solution. For this reason, the conductivity of the produced composite resin material particles and the molding product obtained by molding them can be improved. The dispersant and/or surfactant usable in this aspect can be exemplified by the Triton X-100 manufactured by AcrosOrganics, the Targetol NR-7 manufactured by Sigma-Aldrich, sodium dodecyl sulfate (SDS), and sodium dodecyl benzene sulfonate (SDBS), and the like, similarly to the fifteenth aspect.

DESCRIPTION OF EMBODIMENTS

Figure 1:
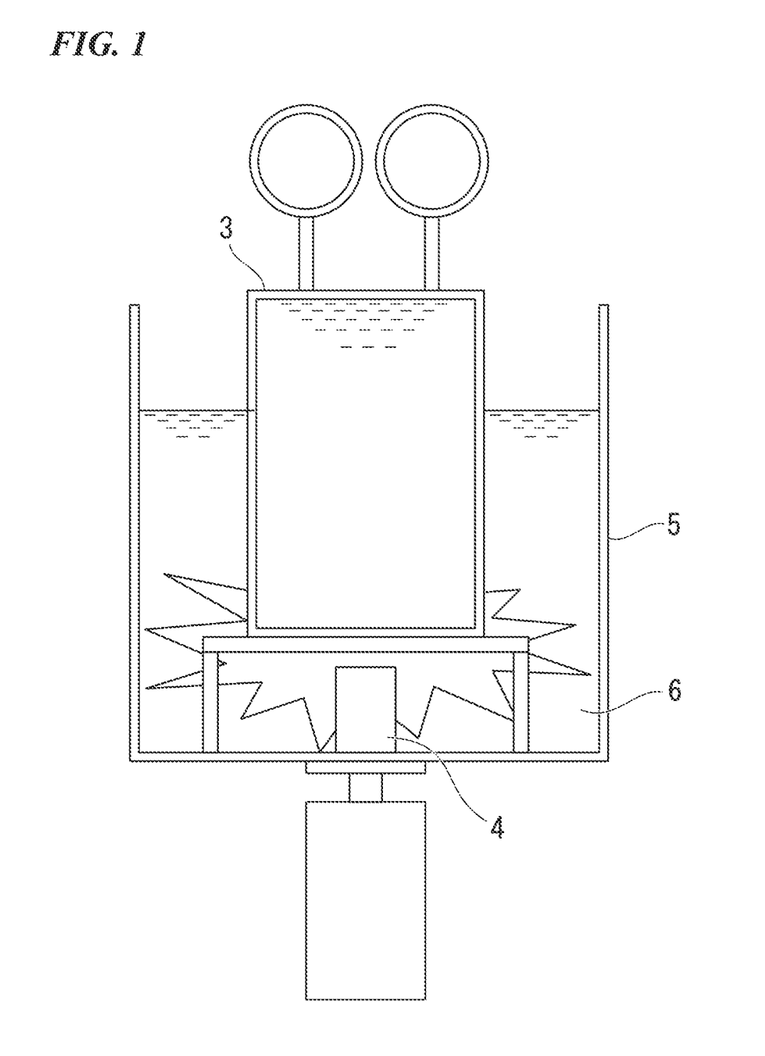
FIG. 1 is a schematic diagram illustrating an example of the production method of a composite resin material particle.

FIG. 1 is a schematic diagram illustrating an example of the production method of a composite resin material particle. A resin material particle 1 and a conductive nano-material 2 are filled into a pressure vessel 3 at least together with liquid carbon dioxide and a solvent for propagating ultrasonic waves. The pressure vessel is heated by water 6 in a water bath 5. In FIG. 1, the ultrasonic oscillator 4 is set under the water bath 5 to propagate ultrasonic waves through the water 6 inside the water bath 5. However, the oscillator 4 may be directly set in the pressure vessel 3.

Figure 2A:
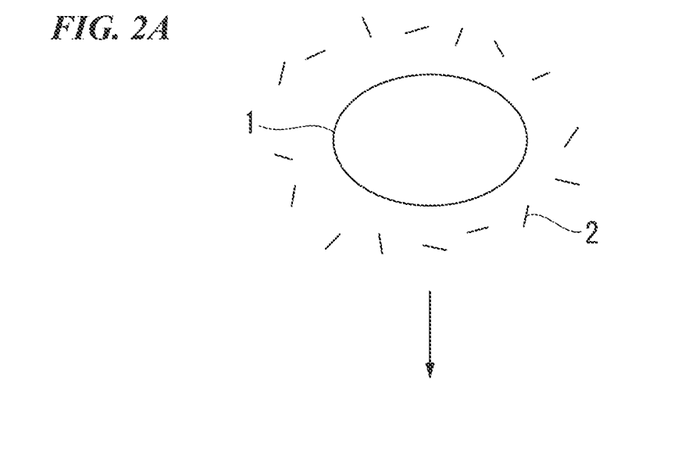
FIG. 2A is a schematic diagram illustrating a process in which a conductive nano-material is dispersedly mixed in the surface of a resin material particle.
Figure 2B:
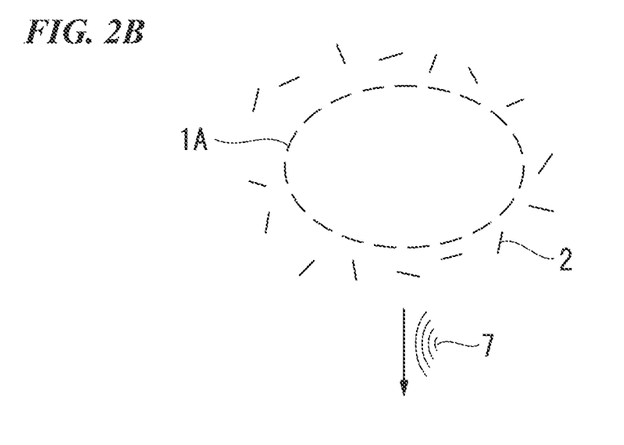
FIG. 2B is a schematic diagram illustrating the process in which the conductive nano-material is dispersedly mixed in the surface of the resin material particle.
Figure 2C:
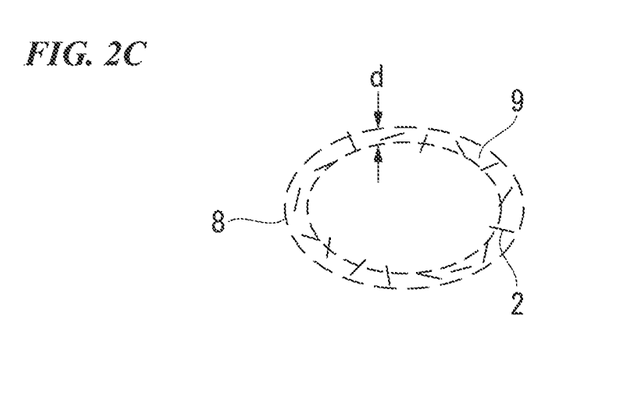
FIG. 2C is a schematic diagram illustrating the process in which the conductive nano-material is dispersedly mixed in the surface of the resin material particle.

FIG. 2A to FIG. 2C are schematic diagrams illustrating the process in which the conductive nano-material 2 is dispersedly mixed in the surface of the resin material particle 1.

FIG. 2A shows a state before the resin material particle 1 is swelled. Since the resin material particle 1 is not swelled yet, the surface is still in a cure state. In this state, the conductive nano-material 2 can not be dispersedly mixed.

FIG. 2B shows a state after the resin material particle 1 is swelled. In this state, since the surface is softened, the conductive nano-material 2 can be readily mixed into the swollen resin material particle 1A. However, without the irradiation of ultrasonic waves, the conductive nano-material 2 can not be mixed from the surface to the inside of the resin material particle 1.

FIG. 2C shows a state in which the conductive nano-material 2 is mixed from the surface to the inside due to the action of the ultrasonic waves 7. It is assumed that, because of the action of the ultrasonic waves 7, bubbles are generated and rapidly burst, and the occurring impact makes the conductive nano-material 2 be mixed in the resin material particle 1. In addition, because of the ultrasonic waves 7, the conductive nano-material 2 is substantially evenly distributed and dispersedly mixed in the surface of the resin material particle 1. Therefore, the polarization of the conductive nano-material 2 in the direction of the force of gravity and the sedimentation of unmixed pieces of the conductive nano-material 2 on the resin material particle 1 can be prevented.

The liquid carbon dioxide does not cause cavitation either in a subcritical state or a supercritical state, and thus does not propagate ultrasonic waves. Accordingly, in the process illustrated in FIG. 2A to FIG. 2C, a solvent for propagating ultrasonic waves is a must. The composite resin material particle 8 is formed through this process. The dispersion mixing layer 9 of this composite resin material particle 8 has a mixed thickness d. The conductive nano-material 2 within the dispersion mixing layer 9 is embedded in the surface of the composite resin material particle 8 and firmly fixed. Therefore, the conductive nano-material 2 will not spall unless the dispersion mixing layer 9 is shaved off.

Figure 3:
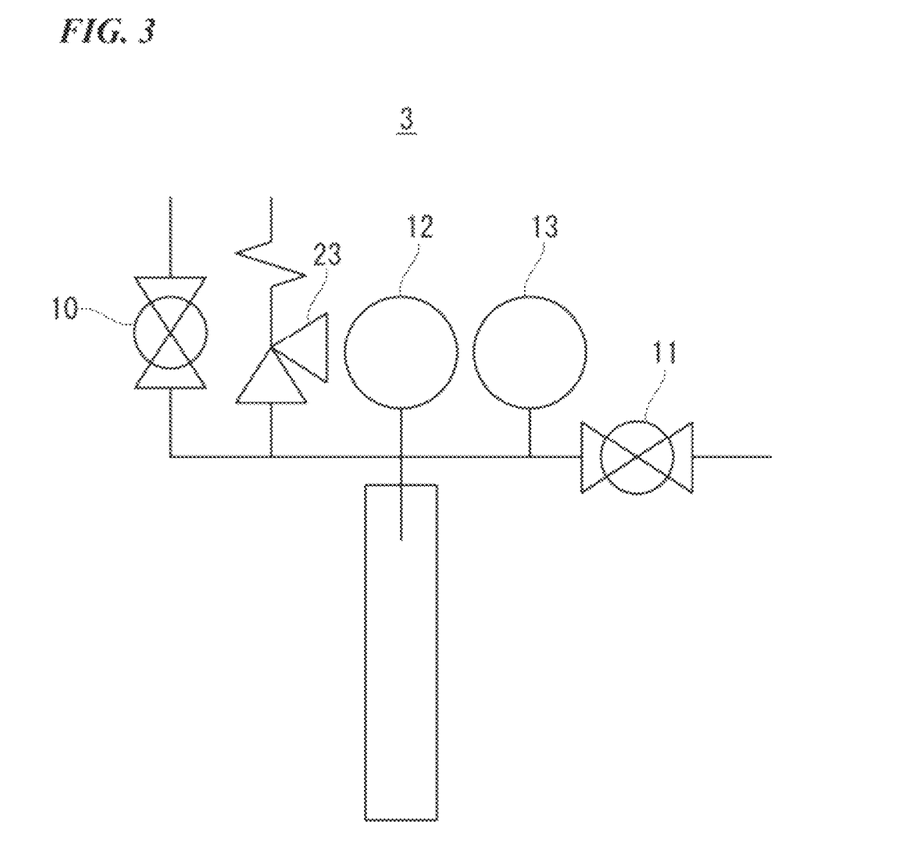
FIG. 3 is a systematic diagram illustrating an example of the pipe arrangement of a small sized pressure vessel.

FIG. 3 is a systematic diagram illustrating the pipe arrangement of the pressure vessel 3. After filling the materials, the liquid carbon dioxide, and the solvent, the valves 10 and 11 are closed to seal the case. The temperature and the pressure inside the pressure vessel 3 are measured by a thermometer 12 and a pressure gauge 13. When the pressure inside the pressure vessel 3 exceeds the designed upper limit of the pressure vessel 3, the pressure is let out by a safety valve 23.

Figure 4:
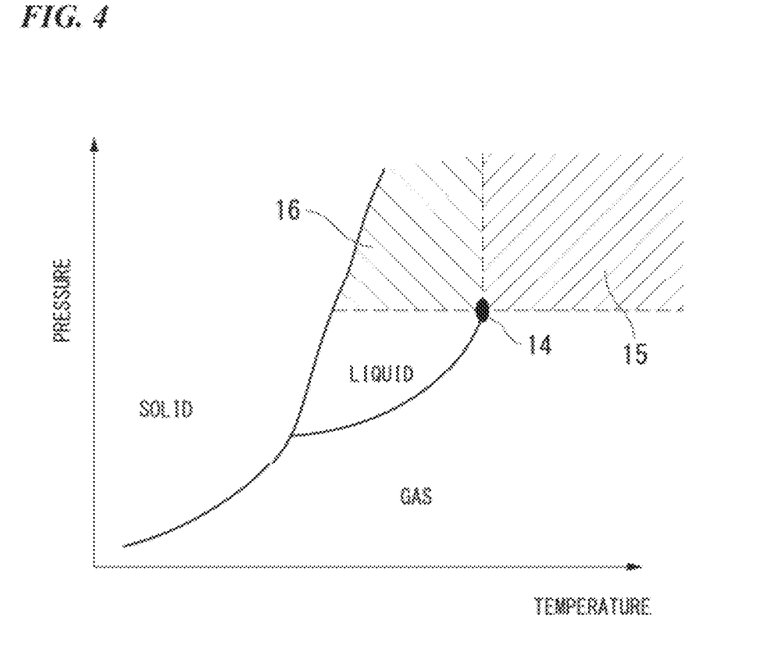
FIG. 4 is a phase diagram of carbon dioxide.

FIG. 4 is a phase diagram of carbon dioxide. The critical point 14 of carbon dioxide is present at the critical temperature of 31.1° C. and the critical pressure of 72.8 atm. The term supercritical state 15 refers to a state in which carbon dioxide has a temperature and a pressure equal to or above the critical point 14. In this state, carbon dioxide has a high property to swell the resin, and therefore, promotes the formation of the dispersion mixing layer. The term subcritical state 16 refers to a state in which carbon dioxide has a pressure equal to or above the critical point 14 and a temperature equal to or below the critical point 14. Even in this state, carbon dioxide is able to swell the resin, and therefore, can promote the formation of the dispersion mixing layer. By sufficiently reducing the pressure of the carbon dioxide, the carbon dioxide can be rapidly gasified to quickly remove the carbon dioxide from the composite resin material particle.

Figure 5A:
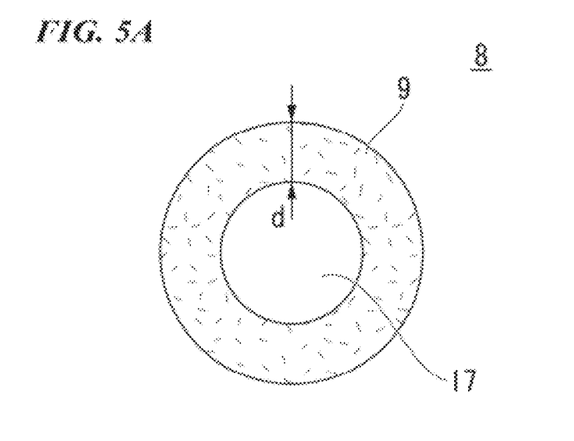
FIG. 5A is a schematic diagram illustrating an example of the structure of the dispersion mixing layer in the composite resin material particle.
Figure 5B:
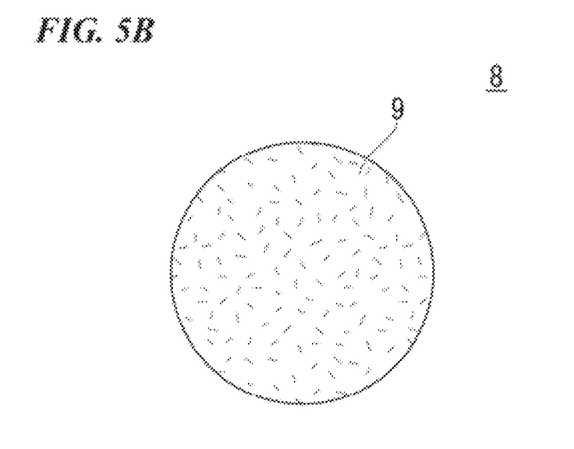
FIG. 5B is a schematic diagram illustrating another example of the structure of the dispersion mixing layer in the composite resin material particle.

FIG. 5A and FIG. 5B are schematic diagrams illustrating structures of the dispersion mixing layer 9 in the composite resin material particle 8. In the composite resin material particle 8 of FIG. 5A, the dispersion mixing layer 9 has a predetermined mixed thickness d and a resin-only region 17 is present inside. This composite resin material particle 8 contains only a small amount of the conductive nano-material 2. However, nonetheless it is highly conductive. In the composite resin material particle 8 of FIG. 5B, the whole of the particle is solely composed of the dispersion mixing layer 9. Such a composite resin material particle 8 can be obtained if the grain diameter of the resin material particle 1 as the raw material is sufficiently small, the melting point of the resin material particle 1 is sufficiently low, the amount of the conductive nano-material 2 is sufficiently large, and the time to produce the composite resin material particle 8 is sufficiently long.

A molding product having a conductive net inside can be produced by melting and fusing these composite resin material particles 8. These composite resin material particles 8 lose their shapes by melting and liquefaction. However, the conductive nano-material 2 within the dispersion mixing layer 9 is kept from being freed due to the viscosity of the melted resin material liquid. Thus, the continuity of the dispersion mixing layer 9 can be maintained. Accordingly, the conductive net originating from the dispersion mixing layer 9 also has a continuity and high conductivity. Therefore, a highly conductive molding product can be obtained by such melting and fusion. In addition, because the resin material inside the composite resin material particles 8 has been melted and fused, the obtained molding product is sturdy and tough.

EXAMPLES

Example 1: Production of Composite Resin Material Particles

Into a pressure vessel were filled 170 mg of polycarbonate (PC) pellets having an average grain diameter of 3 mm, 5 g of a dispersion liquid containing carbon nanotubes (CNT) at a concentration of 0.3 wt % in ethanol as a solvent, and 48 g of liquid carbon dioxide. The pressure vessel was then soaked in a water bath filled with hot water kept at 65° C., and was subjected to supercritical dispersion with ultrasonic waves for 10 hours by using an ultrasonic oscillator that had been provided under the water bath (the ultrasonic wave generator is the GSD-600AT manufactured by Ginsen). Two types of CNT, the Baytubes C150P (average diameter of $\varphi 11$ nm) manufactured by Bayer Holding Ltd. and the VGCF-S (average diameter of $\varphi 80$ nm) manufactured by Showa Denko K.K., were used.

After the treatment, the pressure vessel was opened to evaporate the liquid carbon dioxide. Then, the pressure vessel was treated in a normal pressure electric furnace at 105° C. for 24 hours to thereby volatilize the ethanol. By so doing, a CNT-modified PC pellet was obtained.

Figure 6A:
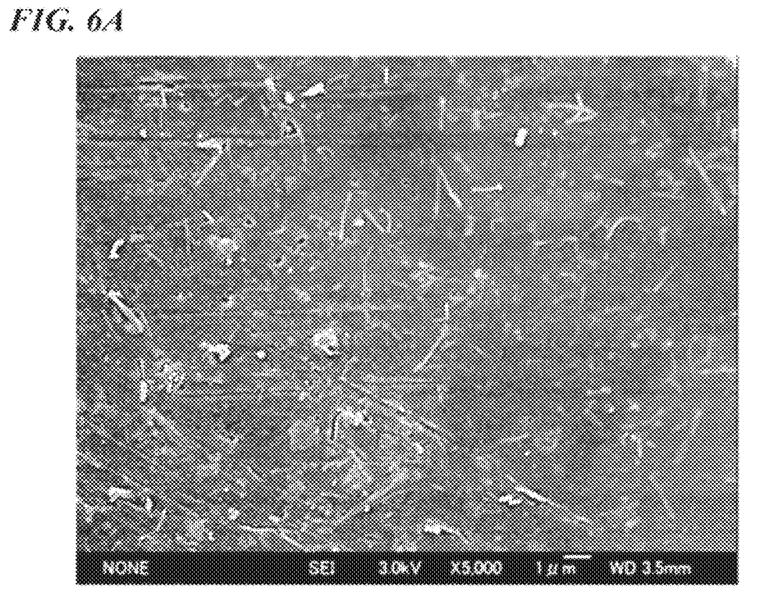
FIG. 6A is a SEM image showing the surface and the cross-section of a CNT-modified PC pellet.
Figure 6B:
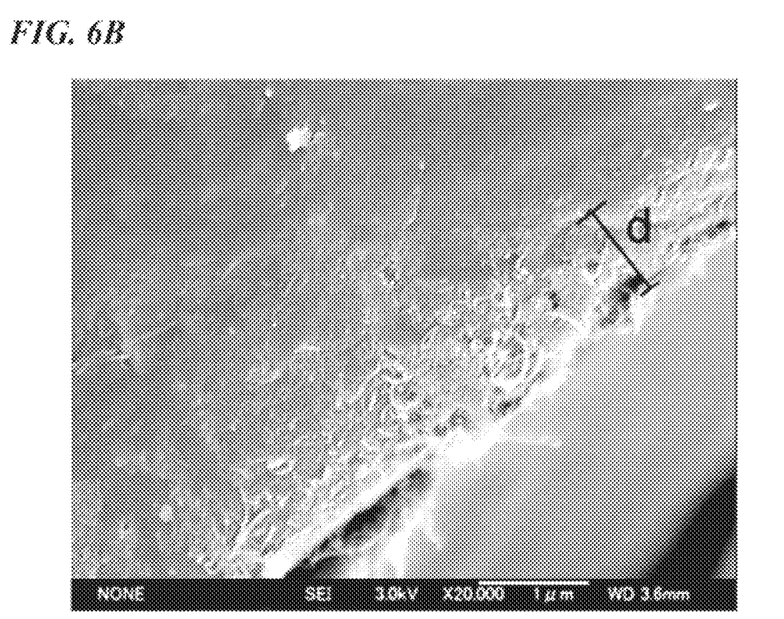
FIG. 6B is a SEM image showing the surface and the cross-section of the CNT-modified PC pellet.

FIG. 6A and FIG. 6B are SEM images showing the surface and the cross-section of the CNT-modified PC pellet. FIG. 6A is the SEM image of the surface and FIG. 6B is the SEM image of the cross-section. It was confirmed that CNTs were uniformly and dispersedly mixed in the surface, and a dispersion mixing layer having a mixed thickness d and a depth of about 1 μm was evenly found in the cross-section.

Example 2: Production of Molding Product

Into a pressure vessel were filled 16 g of a polytetrafluoroethylene (PTFE) powder having an average grain diameter of 5 μm, 48 g of a dispersion liquid containing carbon nanotubes (CNT) at a concentration of 1.0 wt % in ethanol as a solvent so that the CNT weight with respect to PFTE would be 3 wt %, and 48 g of liquid carbon dioxide so that the ratio of the liquid carbon dioxide to the solvent would be 1. Two types of CNT, the Baytubes C150P (average diameter of $\varphi 11$ nm) manufactured by Bayer Holding Ltd. and the VGCF-S (average diameter of $\varphi 80$ nm) manufactured by Showa Denko K.K., were used.

This pressure vessel was soaked in a water bath filled with hot water kept at 65° C., and was subjected to supercritical dispersion with ultrasonic waves for 10 hours by using an ultrasonic oscillator that had been provided under the water bath (the ultrasonic wave generator is the GSD-600AT manufactured by Ginsen). After the treatment, the pressure vessel was opened to evaporate the liquid carbon dioxide. Then, the pressure vessel was treated in a normal pressure electric furnace at 105° C. for 24 hours to thereby volatilize the ethanol. By so doing, a PFTE powder having dispersedly mixed CNT was obtained. In the SEM observation, the resin and CNT were found to be evenly mixed in both cases of two types of CNT.

These two types of powders were used as the raw material. Each of them was respectively filled into a magnetic ash tray (L50 mm×W30 mm×H10 mm) by powder compacting. The molding was done in an electric furnace at 350° C. for 1 hour. By so doing, a molding product 1 (Baytubes C150P) and a molding product 2 (VGCF-S) were obtained. In addition, as a comparative example, a commercially available 5 wt % CNT-containing polycarbonate (PC) pellet was molded in the same manner (at 270° C. for 1 hour). By so doing, a molding product 3 was obtained.

The surface resistance of these molding products was measured by a surface resistance meter (MEGARESTA-HO709 Shishido Electrostatic. Ltd). The surface resistance of the molding product 3 produced from the commercially available CNT-containing PC was $4.1 \times 10^8$ $\Omega/cm^2$, while the surface resistances of the molding products 1 and 2 were from $1.0 \times 10$ $\Omega/cm^2$ to $3.0 \times 10$ $\Omega/cm^2$. The raw material of the molding products 1 and 2 was highly insulative PFTE having a low concentration of CNT. Nonetheless, they showed lower electrical resistance than that of the commercially available CNT-containing PC, and were capable of molding highly conductive materials.

INDUSTRIAL APPLICABILITY

According to the present invention, highly conductive composite resin material particles can be readily obtained with use of a small amount of a conductive nano-material. During the production of the composite resin material particles, carbon dioxide and the solvent are readily gasified. Thus, the process can be made easier and simpler. Because these composite resin material particles can be used for forming a molding product having a highly conductive net, a highly conductive molding product can be obtained with use of a small amount of the conductive nano-material. Accordingly, the present invention contributes to produce highly conductive resin molding products by a highly industrial method with low cost.

REFERENCE SIGNS LIST

1 Resin material particle
1A Swollen resin material particle
2 Conductive nano-material
3 Pressure vessel
4 Ultrasonic oscillator
5 Water bath
6 Water
7 Ultrasonic waves
8 Composite resin material particle
9 Dispersion mixing layer
10 Valve
11 Valve
12 Thermometer
13 Pressure gauge
14 Critical point
15 Supercritical state
16 Subcritical state
17 Resin-only region
23 Safety valve

The invention claimed is:

1. A composite resin material particle which is formed by a resin material particle that is a material for producing a resin molding product and a conductive nano-material, comprising:
a resin-only region that is solely composed of a resin material of the resin material particle; and
a dispersion mixing layer which is obtained by dispersedly mixing the conductive nano-material from a surface of the resin material particle to an inside of the resin material particle, wherein
the resin-only region is present in the inside of the composite resin material particle and 60% or higher of a surface of the resin-only region is enclosed by the dispersion mixing layer,
the dispersion mixing layer is formed over all of the surface or at least a part of the surface of the resin-only region,
the conductive nano-material is dispersedly mixed within the resin material of the resin material particle in the dispersion mixing layer,
the dispersion mixing layer forms a conductive layer,
the mixed thickness of the dispersion mixing layer is from 0.1 μm to 1 μm,
the conductive nano-material within the dispersion mixing layer has a shape with an outer diameter of 150 nm or smaller and a length of 500 nm or longer,
the dispersion mixing layer includes a conductive net that is composed of the conductive nano-materials,
the resin material is polytetrafluoroethylene, and
the conductive nano-material is one or more selected from the group consisting of a carbon nanotube, a carbon nanofiber, a carbon nanocoil, a carbon nanotwist, a carbon nanohorn, a metal nanoplate, a metal nanorod, and a metal nanowire.

2. The composite resin material particle according to claim 1, wherein the dispersion mixing layer is formed over all of the surface of the composite resin material particle.

3. The composite resin material particle according to claim 1, which is a powder having a diameter of 100 μm or smaller.

4. The composite resin material particle according to claim 1, wherein the conductive nano-material has a shape with an outer diameter of 80 nm or smaller and a length of 500 nm or longer.

5. A production method of a composite resin material particle, comprising:
filling at least a resin material particle, a conductive nano-material, a solvent for propagating ultrasonic waves, and liquid carbon dioxide, into a pressure vessel;
holding the inside of the pressure vessel at a temperature and a pressure which can keep the liquid carbon dioxide in a subcritical or supercritical state;
dispersedly mixing the conductive nano-material from a surface of the resin material particle to an inside of the resin material particle by using ultrasonic waves;
thereafter evaporating the liquid carbon dioxide by reducing the pressure; and
further volatilizing the solvent either concurrently or with time lag, to obtain the composite resin material particle comprising: a resin-only region that is solely composed of a resin material of the resin material particle; and a dispersion mixing layer which is obtained by dispersedly mixing the conductive nano-material from the surface of the resin material particle to the inside of the resin material particle, wherein
the resin-only region is present in the inside of the composite resin material particle and 60% or higher of a surface of the resin-only region is enclosed by the dispersion mixing layer,
the mixed thickness of the dispersion mixing layer is from 0.1 μm to 1 μm, the conductive nano-material within the dispersion mixing layer has a shape with an outer diameter of 150 nm or smaller and a length of 500 nm or longer, the dispersion mixing layer includes a conductive net that is composed of the conductive nano-materials, the resin material is polytetrafluoroethylene, and the conductive nano-material is one or more selected from the group consisting of a carbon nanotube, a carbon nanofiber, a carbon nanocoil, a carbon nanotwist, a carbon nanohorn, a metal nanoplate, a metal nanorod, and a metal nanowire.

6. The production method of a composite resin material particle according to claim 5, wherein the solvent is a highly volatile solvent at normal temperature and normal pressure.

7. The production method of a composite resin material particle according to claim 6, wherein the solvent is one or more selected from the group consisting of an alcohol, a ketone, an ester, an ether, an organochloride, and an organofluoride.

8. The production method of a composite resin material particle according to claim 5, wherein a ratio by weight of the solvent to the conductive nano-material is 20 or more.

9. The production method of a composite resin material particle according to claim 5, wherein a ratio by weight of the liquid carbon dioxide:the solvent is from 0.05:1 to 20:1.

10. The production method of a composite resin material particle according to claim 5, wherein a dispersant and/or a surfactant is added in the pressure vessel.

11. The production method of a composite resin material particle according to claim 5, wherein the temperature is over 25° C. and below the melting point temperature of the resin material.

12. The production method of a composite resin material particle according to claim 5, wherein the maximum pressure inside the pressure vessel is 100 MPa.

13. The production method of a composite resin material particle according to claim 5, wherein a generator of the ultrasonic waves is a horn type of a 150 W or higher.

14. The production method of a composite resin material particle according to claim 5, wherein the conductive nano-material has been oxidatively treated.

15. The production method of a composite resin material particle according to claim 5, wherein a dispersion liquid, which is obtained by mixing and dispersing at least the conductive nano-material in the solvent, is filled into the pressure vessel together with the liquid carbon dioxide and the resin material particle.

16. The production method of a composite resin material particle according to claim 15, wherein the dispersion liquid contains a dispersant and/or a surfactant.

17. The composite resin material particle according to claim 1, wherein the dispersion mixing layer is formed in island shapes, and a distance between the island shapes is 500 nm or smaller.

18. The production method of a composite resin material particle according to claim 5, wherein the dispersion mixing layer is formed in island shapes, and a distance between the island shapes is 500 nm or smaller.

19. The composite resin material particle according to claim 3, wherein the diameter of the composite resin material particle is 1 μm or greater and 100 μm or smaller.

20. The composite resin material particle according to claim 19, wherein the diameter of the composite resin material particle is 5 μm or greater and 100 μm or smaller.

21. The composite resin material particle according to claim 20, wherein the diameter of the composite resin material particle is 5 μm.

* * * * *